UNITED STATES PATENT OFFICE.

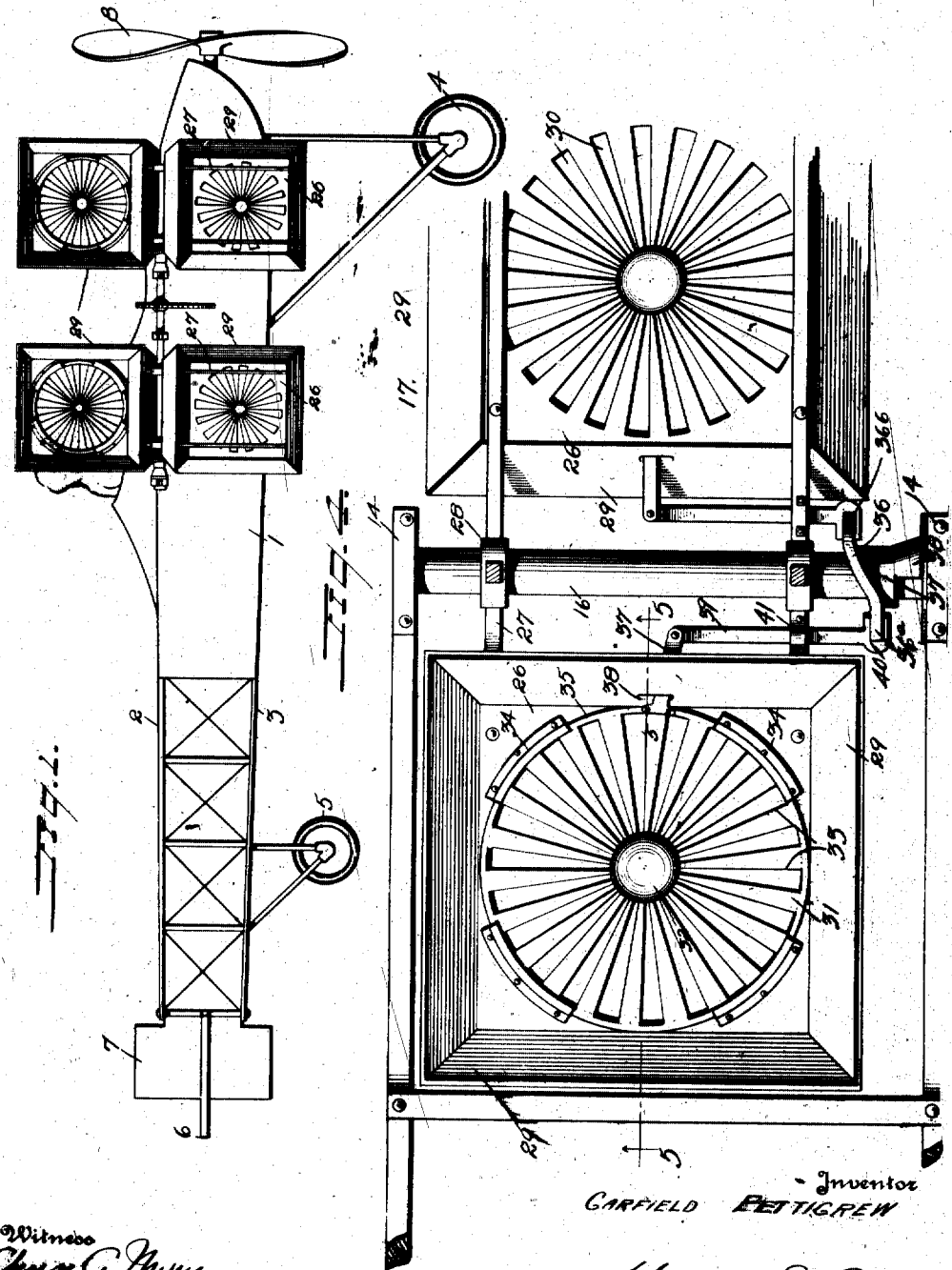

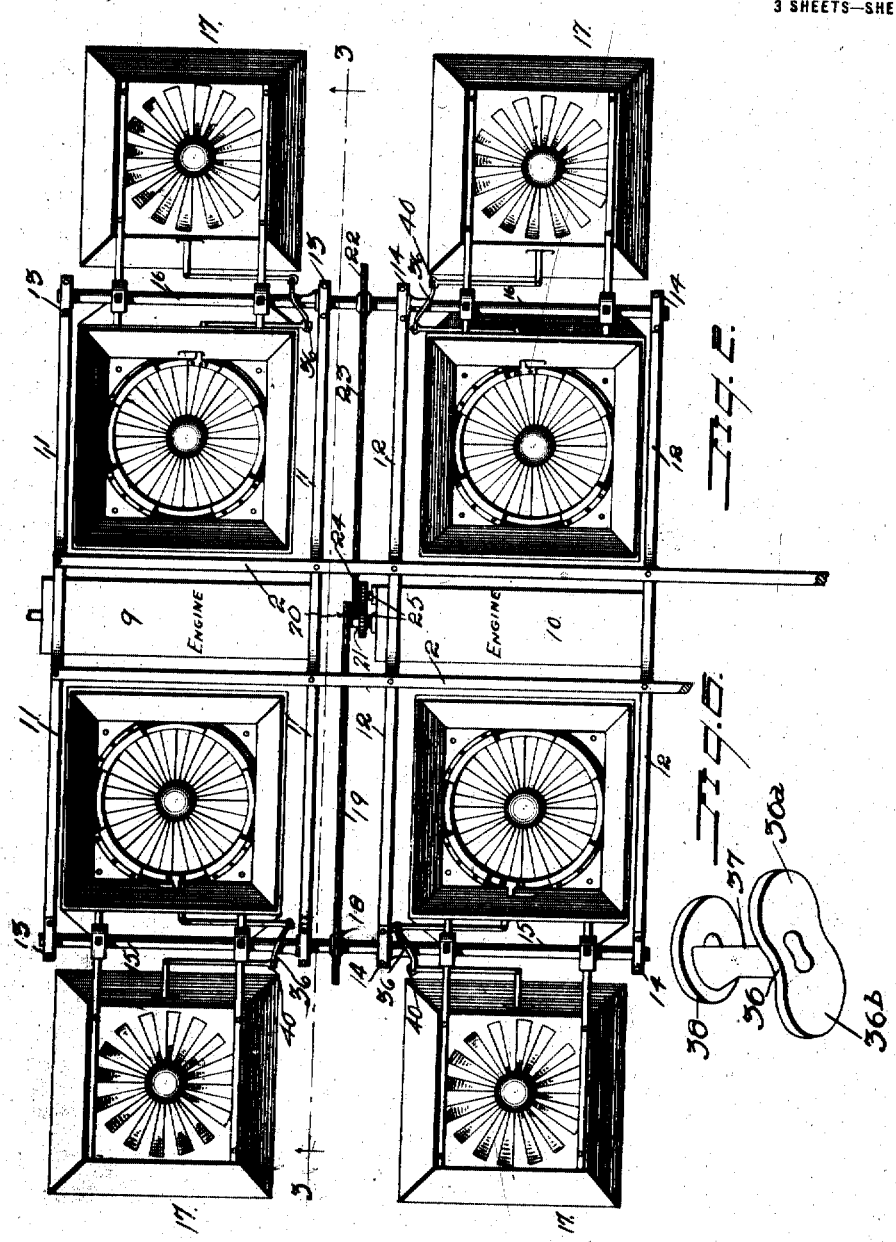

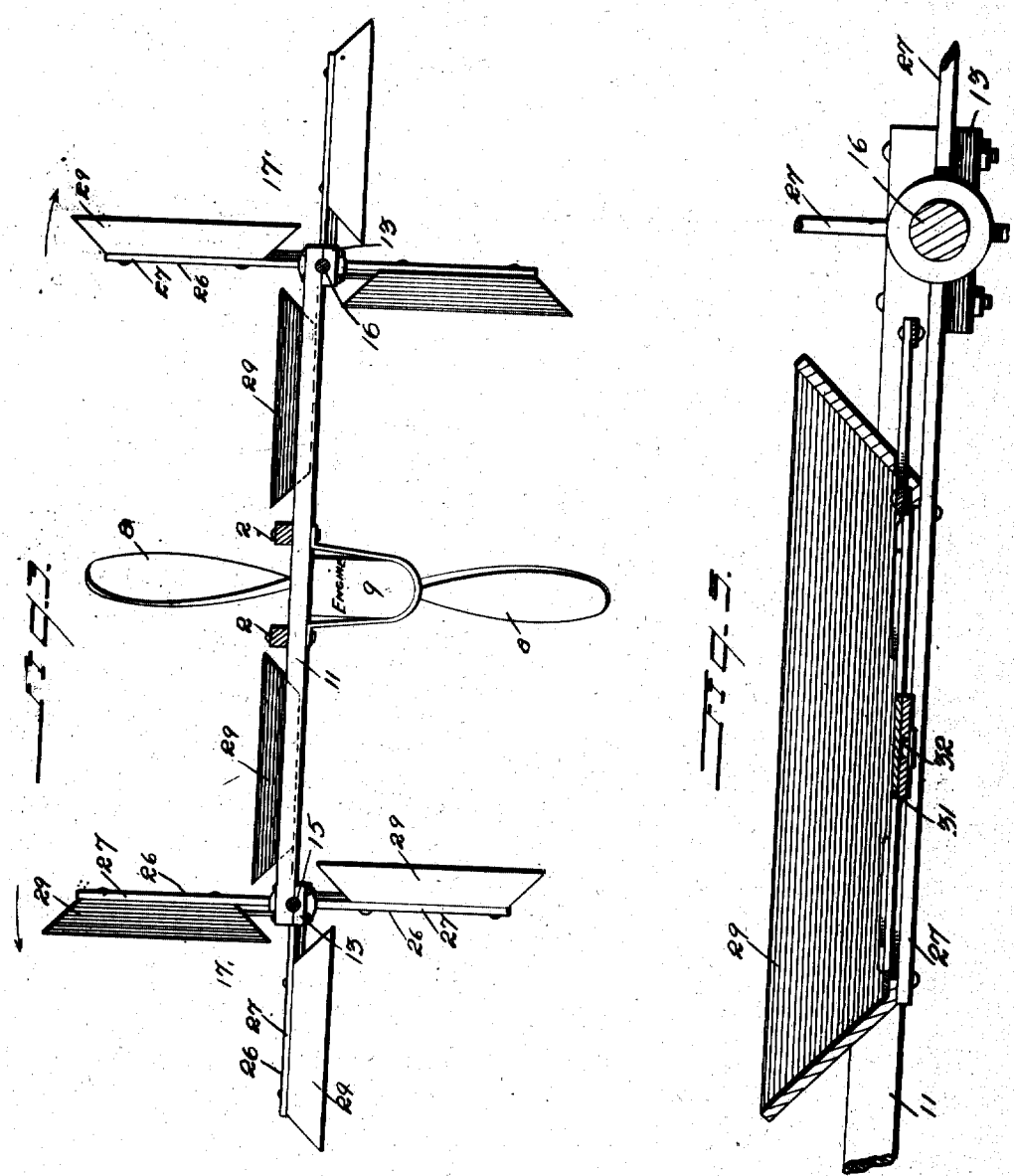

GARFIELD PETTIGREW, OF ELWOOD, INDIANA.

AIRSHIP.

1,279,755.  Specification of Letters Patent.  Patented Sept. 24, 1918.

Application filed October 25, 1917. Serial No. 198,450.

*To all whom it may concern:*

Be it known that I, GARFIELD PETTIGREW, a citizen of the United States, and a resident of Elwood, in the county of Madison and State of Indiana, have invented a new and useful Improvement in Airships, of which the following is a specification.

My invention relates to improvements in aircraft, relating more particularly to an improvement in an airship of the heavier-than-air type, and it consists in the constructions, combinations, and arrangements herein described and claimed.

An object of my invention is to provide an airship having a plurality of impeller wheels rotatably mounted upon axles journaled in the frame of the machine, the blades of the impeller wheels having reciprocating shutters operated by cams to open the shutters on the up-stroke and close the shutters on the down-stroke.

Another object of my invention is to provide an airship as described, including impeller wheels with an engine for operating the same, and a propeller with a separate engine for operating the propeller, the engines being independently controlled by the operator so that the ascent and forward movement of the airship may be obtained as the operator desires.

Another object of the invention is to provide an airship having impeller wheels for causing the ascent of the airship and a tractor propeller for causing the forward movement of the airship, the device omitting the use of planes as one of its characteristic features.

Other objects and advantages will appear in the following specification, reference being had to the accompanying drawings, in which:

Figure 1 is a side elevation of an airship constructed in accordance with my invention.

Fig. 2 is a plan view.

Fig. 3 is a section taken substantially on the line 3—3 of Fig. 2.

Fig. 4 is a detail plan view of a portion of one of the impeller wheels showing the cam for reciprocating the shutters.

Fig. 5 is a section on the line 5—5 of Fig. 4, and

Fig. 6 is a perspective view of one of the shutter reciprocating cams.

In carrying out my invention, I provide an airship having the main fuselage 1 including the upper substantially parallel frame members 2 and lower similarly disposed frame members 3. The airship has the ground or landing wheels 4 and 5, the elevating rudder 6, and direction rudder 7, all of these elements being of an ordinary construction.

A tractor screw or propeller 8 is mounted upon the front of the airship, and is propelled by an engine 9 which is controlled separately by the operator or aviator, from an engine 10 which is arranged to drive two pairs of impeller wheels journaled upon the frame of the airship.

Two pairs of cross bars 11 and 12 constituting the members of a sub-frame, are mounted upon and secured upon and transversely of the members 2 of the fuselage 1 at the front end. The respective cross bars extend equal distances beyond the sides of the fuselage 1 as illustrated in Fig. 2, and support bearings 13 and 14, respectively, in which the axles 15 and 16 of the impeller wheels 17 are journaled.

The axle 15 of the impeller wheel 17 at the left, has a sprocket 18 to which a chain 19 is applied. The chain 19 is driven by a sprocket 20 on the crank shaft 21 of the engine 10. The axle 16 of the impeller wheel 17 at the right, has a sprocket 22 to which a chain 23 is applied. The chain 23 is driven by a sprocket 24 on a countershaft suitably mounted adjacent to the crank shaft 21, and which is driven by intermeshing gears 25, one of which is mounted upon the crank shaft of the engine. The sprocket and chain connections just described, obtain the rotation of the axles 15 and 16 in counter-clockwise and clockwise directions, respectively, so that the impeller wheels 17 move inwardly and toward each other with respect to the fuselage 1.

The construction of each of the impeller wheels 17 being alike, the description of but one will follow. Attention is directed to Fig. 4 which represents a portion of the impeller wheel 17 shown at the upper right of Fig. 2. Each impeller wheel has a plurality of blades 26, secured to spokes 27 radiating from hubs 28 on the axle 16 of the impeller wheel. The hubs 28 are fixed on the axle and when the axle is rotated, the impeller wheel 17 moves in a clockwise direction.

The impeller blades 26 are preferably rectangular in shape to conform with the general rectangular shape of the sub-frame on which the impeller wheels rotate. Each impeller blade 26 has outwardly flared walls 29 which are so arranged to form a cup as it were, and provide an air pocket by means of which a more stable hold or support can be gotten on the air and convey the airship upwardly.

Each impeller blade 26 has a plurality of air slots 30 preferably radiating from a center as shown. A reciprocating shutter 31 is mounted upon a stud 32 at the center of the series of air slots 30. The reciprocating shutter 31 has a plurality of radiating air slots 33 stamped out of the metal of the shutter, and adapted to be moved into and out of registration with the air slots 30 over which the shutter 31 moves.

The shutters 31 are mounted on the inside of the impeller blades 26 and are held in place by guides 34 which engage the perimeter of each shutter. In this connection, it will be observed that the shutter 31 is of a greater diameter than the diameter which bounds the air slot 30 in the impeller blade 26. Thus, in stamping out the air slots 33 in the shutter 31, a solid peripheral ring 35 is left which keeps the air slots 33 equally spaced and coacts with the guides 34.

The shutters 31 are reciprocated to open and close the air slots 30 in the impeller blades 26 at the proper time, by a cam which is mounted upon an adjacent portion of the sub-frame in fixed relationship to each of the impeller wheels. Each shutter 31 has an arm 37 secured to the ring 35 and projecting through a slot 38 in the adjacent flaring wall 29 of the impeller blade. A connecting rod 39 is pivoted at one end to the extremity of the arm 37, and has at the other end, a bifurcated head 40 which engages and follows the periphery of the cam 36. Each connecting rod 39 is guided in a bearing 41 affixed to an adjacent spoke 27.

The cam 36 consists simply of a circular plate which is twisted laterally substantially as shown in Figs. 4 and 6, to provide lobes 36ª and 36ᵇ offset with respect to each other, and lying in different horizontal planes. The obvious result of the action of the cam 36 on the shutters 31 is, that when the bifurcated head 40 is in engagement with the lobe 36ª, the air slots 30 are opened. When the bifurcated head 40 is in engagement with the lobe 36ᵇ, the air slots 30 are closed. Therefore, the riding over of the bifurcated head 40 of the connecting rod 39 on the periphery of the cam 36, obtains the reciprocation of the slotted shutters 31 over the air slots 30 of the impeller blades 26. The cam 36 includes a sleeve 37 having a base 38 by which the cam is secured in place on an adjacent portion of the sub-frame.

The operation of the device is as follows:

The pairs of impeller wheels 17 on each side of the fuselage 1, rotate in counter-clockwise and clockwise directions, respectively, as indicated in Fig. 3. Each impeller blade 26 has flaring walls 29 to give the impeller blade a substantially cup-shape.

The air slots 30 in the impeller blades 26, begin to open on the commencement of the up-stroke of the individual impeller blades, and close on the commencement of the down-stroke. The greatest resistance is therefore obtained on the down-stroke of the impeller blades, while the opening of the air slots 30 on the up-stroke, permits the passage of the air through the impeller blade and thus offers the least resistance. Obviously, by closing the air slots 30 of the impeller blades upon the commencement of the down-stroke, a certain amount of air is pocketed in the cup-shaped blade, or, in other words, a hold is gotten on the air and the airship is lifted thereupon so that it ascends. The reciprocating shutter 31 provided with the air slots 33 which are adapted to register with the air slots 30 in the impeller blade 26, is reciprocated by the connecting rod 39, the head 40 of which, follows the contour of the cam 36. The cam 36 is so disposed that the shutter 31 of each of the impeller blades is closed and opened at the proper time to form a solid impeller blade on the down-stroke, and an open impeller blade to permit the passage of the air, on the up-stroke.

The impeller wheels 17 are continuously movable while the airship is in flight. The impeller wheels are rotated by the engine 10 which is controlled separately from the engine 9 which operates the propeller 8. Ordinarily when a flight is to be made, the impeller wheels 17 are started so that the airship rises in a substantially vertical direction. If it be desired to take an oblique upward course, the propeller 8 is rotated by starting the engine 9, when the resultant of the two forces represented by the propeller 8 and the impeller wheels 17, will be in an oblique upward direction.

While the construction and arrangement of the device as illustrated in the accompanying drawings is that of a generally preferred form, obvious modifications and changes may be made without departing from the spirit of the invention or the scope of the claims.

I claim:

1. An airship including a sub-frame, an axle journaled on the sub-frame, an impeller wheel mounted on the axle, including a plurality of impeller blades having radial openings, a shutter pivoted upon each blade in the center of the radial openings and rotatable thereover, and relatively fixed means having a reciprocatable connection with each shutter for actuating the shutter.

2. In an airship, a rotatable axle, an impeller wheel supported on the axle and including a plurality of impeller blades having side walls and air slots, a shutter having air openings registrable with the air slots, means for holding the shutter in place, an arm carried by the shutter extending through one of the side walls, a relatively fixed cam, and a connecting rod having a bifurcated head, pivoted to each of the arms of the shutters and engaging said cam at the bifurcated head, for following the contour of the cam to reciprocate the shutters during the rotation of the impeller wheel.

3. In an airship, a rotatable axle, an impeller wheel including a plurality of impeller blades supported on spokes radiating from hubs secured to the axle, each blade having flaring side walls and radial air slots, a shutter pivoted on each impeller blade and having air openings registrable with the air slots, means engaging each shutter at the periphery for holding the shutter in place, an arm carried by the shutter and extending through an adjacent side wall toward the axle, a relatively fixed cam including a sleeve disposed above the axle, and a connecting rod pivoted at one end to the end of the arm of each shutter and having a bifurcated head at the other end engaging the periphery of the cam.

4. An airship including a body portion having a sub-frame, a plurality of pairs of impeller wheels, each impeller wheel including a plurality of impeller blades, rotatable axles journaled on the sub-frame and supporting the plural pairs of impeller wheels, an engine having driving connections with the axles for rotating the axles in opposite directions, shutters mounted upon the impeller blades, and means for operating the shutters at the commencement of the down and up-strokes of the impeller wheels.

5. In an airship, a rotatable axle, an impeller wheel mounted on the axle and including a plurality of impeller blades having flared side walls and perforated bottoms, means for rotating the axle, a relatively fixed cam having lobes disposed in different planes, a shutter pivoted on each impeller blade and controlling the openings, and connections between each shutter and the cam for moving the shutter of each blade to uncover the openings at the commencement of the up-stroke of each impeller blade, and cover the opening of each impeller blade at the commencement of the down-stroke.

GARFIELD PETTIGREW.

Witnesses:
JAMES P. REARDON,
CHAS. MYERS.